(12) United States Patent
Bastide et al.

(10) Patent No.: US 10,904,199 B2
(45) Date of Patent: Jan. 26, 2021

(54) ATTENTION MANAGEMENT FOR ELECTRONIC MESSAGING

(71) Applicant: INTERNATIONAL BUSINESS MACHINES CORPORATION, Armonk, NY (US)

(72) Inventors: Paul R. Bastide, Boxford, MA (US); Liam S. Harpur, Skerries (IE); Matthew E. Broomhall, Goffstown, NH (US); Lin Sun, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/047,978

(22) Filed: Jul. 27, 2018

(65) Prior Publication Data

US 2020/0036672 A1 Jan. 30, 2020

(51) Int. Cl.
*H04L 12/58* (2006.01)
*G06Q 10/06* (2012.01)
*G06Q 10/10* (2012.01)
*H04L 29/06* (2006.01)
*H04L 1/18* (2006.01)

(52) U.S. Cl.
CPC ....... *H04L 51/34* (2013.01); *G06Q 10/06398* (2013.01); *G06Q 10/107* (2013.01); *H04L 51/046* (2013.01); *H04L 51/32* (2013.01); *H04L 1/1848* (2013.01); *H04L 51/043* (2013.01); *H04L 69/28* (2013.01)

(58) Field of Classification Search
CPC ......... H04L 51/22; H04L 51/08; H04L 51/34; H04L 51/32; H04L 51/046; H04L 51/043; H04L 69/28; H04L 1/1848; G06Q 10/107; G06Q 10/06398; G06Q 10/109
See application file for complete search history.

(56) References Cited

U.S. PATENT DOCUMENTS

| | | | |
|---|---|---|---|
| 6,108,688 A | 8/2000 | Nielsen | |
| 7,305,441 B2 | 12/2007 | Mathewson, II et al. | |
| 8,681,019 B2 | 3/2014 | McGuffin | |
| 2004/0243679 A1* | 12/2004 | Tyler | G06Q 10/107 709/206 |

(Continued)

OTHER PUBLICATIONS

"Inbox by Gmail, the inbox that works for you," [online] Google, Inc. [retrieved Jul. 26, 2018] retrieved from the Internet: <https://www.google.com/inbox/>, 7 pg.

(Continued)

*Primary Examiner* — Jungwon Chang
(74) *Attorney, Agent, or Firm* — Cuenot, Forsythe & Kim, LLC

(57) ABSTRACT

A plurality of electronic messages communicated to a recipient can be analyzed to determine, for each of the electronic messages, an amount of time that will be saved for a sender of the electronic message by the recipient performing at least one activity corresponding to the electronic message. The electronic messages can be presented to the recipient in a manner that indicates, for each of the electronic messages, the determined amount of time that will be saved for the sender of the electronic message by the recipient performing the at least one activity corresponding to the electronic message.

17 Claims, 5 Drawing Sheets

(56) References Cited

U.S. PATENT DOCUMENTS

| | | | |
|---|---|---|---|
| 2010/0017484 A1* | 1/2010 | Accapadi | G06Q 10/107 |
| | | | 709/206 |
| 2010/0211592 A1 | 8/2010 | Brownlee | |
| 2010/0250682 A1* | 9/2010 | Goldberg | G06Q 10/107 |
| | | | 709/206 |
| 2011/0087743 A1* | 4/2011 | Deluca | G06Q 10/107 |
| | | | 709/206 |
| 2014/0067982 A1* | 3/2014 | Albouyeh | H04L 12/1818 |
| | | | 709/207 |
| 2016/0191442 A1* | 6/2016 | Penilla | H04L 51/22 |
| | | | 709/206 |
| 2016/0248712 A1 | 8/2016 | Snider et al. | |
| 2016/0277330 A1* | 9/2016 | Jawaharlal | H04L 51/08 |

OTHER PUBLICATIONS

"SaneBox for Business," [online] SaneBox, Inc. © 2018 [retrieved Jul. 26, 2018], retrieved from the Internet: <https://www.sanebox.com/business>, 4 pg.

* cited by examiner

500

```
Analyze each of a plurality of electronic messages communicated to a recipient,
the analyzing comprising, for each of the electronic messages, determining, using
a processor, an amount of time that will be saved for a sender of the electronic
message by the recipient performing at least one activity corresponding to the
electronic message
502
```

↓

```
For at least one of the electronic messages, analyze the electronic message to
determine an estimate of an amount of time that will be required by the recipient
to complete the at least one activity corresponding to the electronic message
504
```

↓

```
Present the plurality of electronic messages to the recipient, presenting the
plurality of messages comprising indicating, for each of the electronic messages,
the determined amount of time that will be saved for the sender of the electronic
message by the recipient performing the at least one activity corresponding to the
electronic message
506
```

FIG. 5

ATTENTION MANAGEMENT FOR ELECTRONIC MESSAGING

BACKGROUND

The present invention relates to data processing systems, and more specifically, to data processing systems that process electronic messages.

Online social networks have become a universal mechanism to connect people and information in logical and organized ways, enabling the sharing and processing of information between users. Common mechanisms of sharing and processing information are walls, activity streams, timelines and profiles. These mechanisms enable users to rapidly share information with other users and gather information from other users in the social networks.

SUMMARY

A method includes analyzing each of a plurality of electronic messages communicated to a recipient, the analyzing including, for each of the electronic messages, determining, using a processor, an amount of time that will be saved for a sender of the electronic message by the recipient performing at least one activity corresponding to the electronic message. The method also can include presenting the plurality of electronic messages to the recipient, presenting the plurality of messages including indicating, for each of the electronic messages, the determined amount of time that will be saved for the sender of the electronic message by the recipient performing the at least one activity corresponding to the electronic message.

A system includes a processor programmed to initiate executable operations. The executable operations include analyzing including, for each of the electronic messages, determining an amount of time that will be saved for a sender of the electronic message by the recipient performing at least one activity corresponding to the electronic message. The executable operations also can include presenting the plurality of electronic messages to the recipient, presenting the plurality of messages including indicating, for each of the electronic messages, the determined amount of time that will be saved for the sender of the electronic message by the recipient performing the at least one activity corresponding to the electronic message.

A computer program product includes a computer readable storage medium having program code stored thereon. The program code is executable by a data processing system to initiate operations. The operations include analyzing each of a plurality of electronic messages communicated to a recipient, the analyzing including, for each of the electronic messages, determining an amount of time that will be saved for a sender of the electronic message by the recipient performing at least one activity corresponding to the electronic message. The operations also can include presenting the plurality of electronic messages to the recipient, presenting the plurality of messages including indicating, for each of the electronic messages, the determined amount of time that will be saved for the sender of the electronic message by the recipient performing the at least one activity corresponding to the electronic message.

BRIEF DESCRIPTION OF THE DRAWINGS

FIG. 5 is a flowchart illustrating an example of a method of presenting electronic messages.

DETAILED DESCRIPTION

Figure 1:
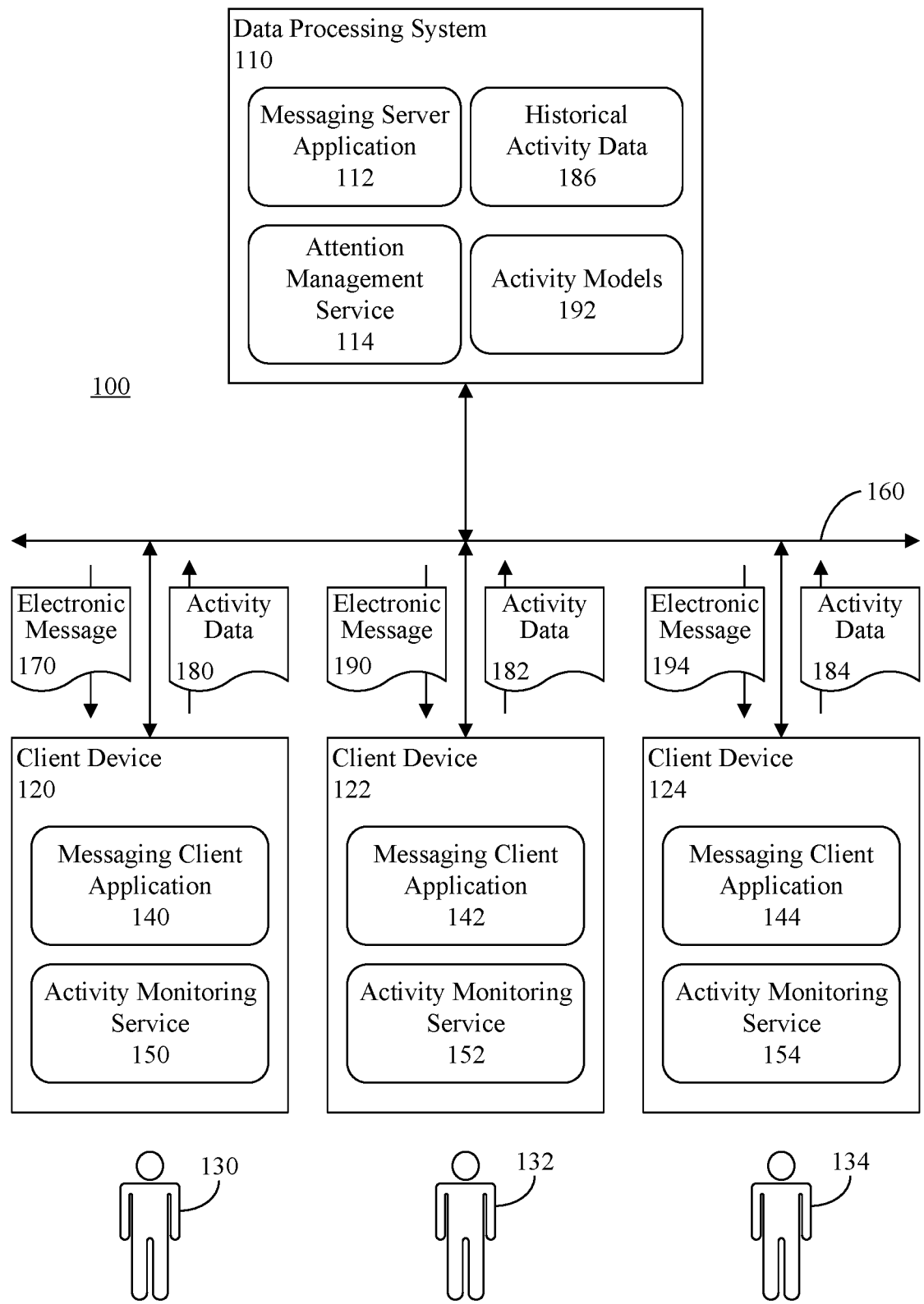
FIG. 1 is a block diagram illustrating an example of a computing environment.

This disclosure relates to data processing systems, and more specifically, to data processing systems that process electronic messages. In accordance with the inventive arrangements disclosed herein, electronic messages communicated to a recipient requesting the recipient to perform activities can be analyzed to determine amounts of time that will be saved for senders of the electronic messages by the recipient performing the activities. Each of the electronic messages can be presented to the recipient with an indication of the amount of time that will be saved for the sender by the recipient performing the activity or activities. Optionally, for each electronic message, an anticipated amount of time for the recipient to perform the activity or activities corresponding to the electronic message can be presented. Moreover, the electronic messages can be prioritized according to the time savings for the senders, due dates, etc., and the electronic messages can be presented to the recipient in an order determined by the respective priorities.

Viewing the electronic messages in a user interface with the respective time savings and, optionally, the anticipated completion times, brings attention of the recipient to electronic messages on which the recipient should focus his/her attention to maximize productivity of users in a work environment. Sorting the electronic messages in the user interface according to the priorities assigned to the electronic messages can serve to facilitate focusing the recipient's attention to the electronic messages where his/her attention should be focused. Further aspects of the present arrangements are described herein.

Several definitions that apply throughout this document now will be presented.

As defined herein, the term "activity" means a response to an electronic message by a recipient of the electronic message or a task indicated in an electronic message that is to be performed by a person.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "social networking service" means an online service platform on which social networks or social relations are built among people who, for example, share interests, activities, backgrounds or real-life connections, and via which people can share information with one another. People can hold conversations in a social networking service by posting messages. As the term "social networking service" is defined herein, an electronic messaging service per se is not a social networking service, though a social networking service can include an electronic messaging service in addition to one or more social networking components.

As defined herein, the term "electronic messaging service" means an electronic mail (e-mail) service, a text messaging service, or an instant messaging service.

As defined herein, the term "electronic message" means an e-mail, a text message, an instant message, or a message posted in a social networking service.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

As defined herein, the term "sender" means a user who sends an electronic message.

As defined herein, the term "recipient" means a user to whom an electronic message is sent.

FIG. 1 is a block diagram illustrating an example of a computing environment 100. The computing environment can include at least one data processing system 110 (e.g., one or more servers). The data processing system 110 can host at least one messaging server application 112. The messaging server application 122 can host a social networking service and/or an electronic messaging service. The data processing system 110 also can host an attention management service 114. The attention management service 114 can be a component of the messaging server application 112 or a stand-alone service executed on the data processing system 110. The attention management service 114 can interface with the messaging server application 112 to present with electronic messages attention indicators, which will be described herein.

The computing environment also can include a plurality of client devices 120, 122, 124, each of which is used by a respective user 130, 132, 134. Each client device 120, 122, 124 can host a messaging client application 140, 142, 144. Examples of messaging client applications 140-144 include, but are not limited to, web browsers, social networking client applications, electronic messaging client applications (e.g., e-mail client applications, text messaging client applications and instant messaging applications) and mobile applications used to exchange electronic messages. Each client device 120, 122, 124 also can host an activity monitoring service 150, 152, 154. The activity monitoring services 150-154 can be components of the messaging client applications 140-144 or stand-alone services executed on the client devices 120-124. Each activity monitoring service 150-154 can monitor activity of the respective users 130-134 using the client devices 120-124.

The data processing system 110 and the client devices 120, 130, 140 can be communicatively linked via at least one communication network 160. The communication network 160 is the medium used to provide communications links between various devices and data processing systems connected together within the computing environment 100. The communication network 160 may include connections, such as wire, wireless communication links, or fiber optic cables. The communication network 160 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

In operation, the user 134 can generate an electronic message 170 using the messaging client application 144 and send the electronic message 170 to the user 130. The messaging client application 144 can communicate the electronic message 170 to the user 130 by interfacing with the messaging application server 112. In this regard, the electronic message 170 can be routed to the messaging client application 140 via the messaging application server 112.

In a pull event (e.g., asynchronous activation) arrangement, interfacing with the messaging application server 112, the attention management service 114 can detect the electronic message 170 being communicated from the messaging client application 144 to the user 130, for example using an electronic messaging service, or the attention management service 114 can detect the electronic message 170 being posted to a social networking service in a manner that shares the electronic message 170 with the user 130. The attention management service 114 can parse from the electronic message 170 information contained in the electronic message 170. For example, the attention management service 114 can use a replication event which accesses a copy of the electronic message 170 from the messaging server application 112, and parse the information from the copy.

In a push event (e.g., asynchronous activation) arrangement, the activity monitoring service 150 can monitor the messaging client application 140 and detect the electronic message 170 being received by the messaging client application 140, or detect the electronic message 170 being accessed (e.g., opened) by the user 130. The activity monitoring service 150 can monitor the messaging client application 140 using an Application Programming Interface (API). In response, the activity monitoring service 150 can parse from the electronic message 170 information contained in the electronic message 170, and communicate the information to the attention management service 114. In another aspect, the activity monitoring service 150 can communicate the electronic message 170 to the attention management service 114, and the attention management service 114 can parse the electronic message 170 the information contained in the electronic message 170.

In a user interface event (e.g., synchronous activation) arrangement, the user 130 can initiate the activity monitoring service 150 to parse from the electronic message 170 information contained in the electronic message 170, and communicate the information to the attention management service 114, or to initiate the activity monitoring service 150 to communicate the electronic message 170 to the attention management service 114, and the attention management service 114 can parse the electronic message 170 the information contained in the electronic message 170. The user 130 can initiate the activity monitoring service 150 to perform such operations by entering a user input into a user interface presented by the client device 120, for example by selecting a menu item, button or icon presented by the messaging client application 140, initiating a haptic trigger, entering a predefined user gesture, launching the messaging client application 140, and so on.

In an aspect of the present arrangements, the attention management service 114 also can access other electronic messages related to the electronic message 170, and parse information from those related messages. The related messages can be identified based on the messages being in a same message thread as the electronic message 170, a conversation identifier, a common sender, a common recipient, etc.

The information obtained from the electronic message 170 and, optionally, other messages related to the electronic message 170, can include, for example, Multi-Purpose Internet Mail Extensions (MIME) data, metadata (e.g., dates/times sent/received, hops, view count, visibility, confidentiality, read status, etc.), text (e.g., in a header, a subject field, a body field, etc.), and so on. In the case of text, the attention management service 114 can analyze the text using natural language processing and semantic analysis to identify the information contained in the text of the electronic message 170 and/or related electronic messages. For example, the attention management service 114 can implement natural language processing (NLP) and semantic analysis on the text contained in the electronic message 170 and/or related electronic messages.

NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) (e.g., ISO/TC37/SC4) publishes standards for NLP. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by the attention management service 114 to implement NLP and semantic analysis.

Responsive to identifying the information contained in the electronic message 170 and/or related electronic messages, based on the MIME data, metadata and/or NLP and semantic analysis performed on text of such electronic message(s), the attention management service 114 can determine an amount of time (hereinafter "time savings") that will be saved for the sender 134 of the electronic message 170 by the recipient 130 initiating at least one action corresponding to the electronic message 170. The time savings can be determined by determining work that is blocked or pending action until the recipient 130 performs at least one activity, for example responding to the electronic message 170 and/or perform at least one task indicated in the electronic message 170. In another aspect, the time savings can be determined by determining an amount of time it would take for the sender 134 to perform at least one task indicated in the electronic message 170.

In illustration, the attention management service 114 can identify, using NLP and semantic analysis, text in the electronic message 170 indicating an activity (e.g., an action) that is requested in the electronic message 170. For example, the attention management service can identify terms indicating "action required," "please review," "need your approval," "blocked," etc., and assign a score to each of the identified terms. The score assigned to such terms can be, for example, a number of minutes (e.g., 100 minutes). Further, the attention management service 114 can identify a number of words in the electronic message 170, and assign a score for the number of words in the electronic message 170. For instance, the attention management service 114 can assign a score of 0 minutes to each word in the electronic message 170 that is "the," "and" and "a," and assign 0.1 minutes to each word in the electronic message 170 that is not "the," "and" or "a." The attention management service 114 can sum the scores assigned to assigned to each of the terms and each of the words to arrive at a total score. The total score can be an estimate of the work that is blocked or pending action until the recipient 130 performs at least one activity.

Further, the attention management service 114 can determine whether the electronic message 170 requires activity by the recipient 130 based on whether the total score exceeds a threshold value. For instance, if the total score exceeds 50 (e.g., 50 minutes), the attention management service 114 can determine that the electronic message 170 requires activity (or prompt activity). If, however, the total score does not exceed 50, the attention management service 114 can determine that the electronic message 170 does not require activity (or prompt activity).

In another example, responsive to the user 134 generating the electronic message 170, or responsive to the user 130 not responding to the electronic message 170 within a threshold period of time after the electronic message 170 is communicated to the messaging client application 140, the attention management service 114 can prompt the user 134 to indicate whether the user 134 is blocked from performing activities until the user 130, or another user 132, responds to the electronic message 170 and/or performs activities requested in the electronic message 170. In illustration, the attention management service 114 can interface with the messaging server application 112 and/or the messaging client application 144 to present to the user 130 a popup window or electronic message requesting a response from the user 134 indicating whether the user 134 is blocked from performing activities until the user 130, or another user 132, responds to the electronic message 170 and/or performs activities requested in the electronic message 170. The user 134 can respond to the prompt by selecting a menu item presented in the popup window or electronic message indicating the user is blocked, and select one or more buttons, icons, etc. to initiate the messaging server application 112 and/or the messaging client application 144 to communicate the user's response to the attention management service 114.

Further, the popup window or electronic message can include a field into which the user 134 can indicate the amount of time that will be saved for the user 134 by the user 130 promptly responding to the electronic message 170 and/or performing activities requested in the electronic message 170. The messaging server application 112 can indicate the amount of time indicated by the user 134 as the that will be saved for the sender 134 of the electronic message 170 by the recipient 130 initiating at least one action corresponding to the electronic message 170. In another aspect, the messaging server application 112 can determine the time savings based on the historical activity data 186, as will be described herein.

In another example, responsive to the user 130 not responding to the electronic message 170 within a threshold period of time after the electronic message 170 is communicated to the messaging client application 140, the attention management service 114 can determine the user 134 is blocked from performing activities until the user 130, or another user 132, responds to the electronic message 170 and/or performs activities requested in the electronic message 170. For example, if the historical activity data 186 indicates the user 130 typically responds to electronic messages within a threshold period of time (e.g., five minutes) and would receive a positive affirmation/success note (indicated by performing NLP and semantic analysis on previous electronic messages), but the user 130 does not respond within the threshold period of time, the attention management service 114 can determine the user 134 is blocked from performing one or more activities until the user 130 responds to the electronic message 170.

As more data is acquired by the attention management service 114 and stored in the historical activity data 186, the attention management service 114 can develop a scoring system for electronic messages without human intervention, for example by scoring language/demographics of electronic messages in order to determine and assign an amount of time a user 130-134 most likely is blocked until responses to the electronic messages are received and/or activities requested in the electronic messages are performed.

Further, the attention management service 114 can assign a priority to the electronic message 170, for example based, at least in part, on the time savings. In an aspect of the present arrangements, the attention management service 114 also can determine an amount of time (hereinafter "completion time") for the recipient 130 to complete the at least one activity corresponding to the electronic message 170. The time savings and completion time can be values, each value indicating a number of minutes, a number of hours, a number of days, a number of weeks, a number of months and/or a number of years. The priority assigned to the electronic message 170 can be a value (e.g., a number) indicating the priority of the electronic message 170, for example a number from 0 to 5, a number from 0 to 10, a number from 0 to 50, a number from 0 to 100, etc.

The attention management service 114 can communicate to the messaging server application 112 the determined time savings, priority ranking and/or completion time for the electronic message 170. The messaging server application 112 can indicate with the electronic message 170 the determined time savings, priority ranking and/or the completion time for the electronic message 170. For example, the messaging server application 112 can include in a data file of the electronic message 170 data indicating the time savings, the assigned priority and/or the completion time for the electronic message 170. The messaging server application 112 can include such data with the electronic message 170 as metadata, one or more values in a header of the electronic message 170, one or more values in a value in a footer of the electronic message 170, or in another suitable manner.

Figure 2:
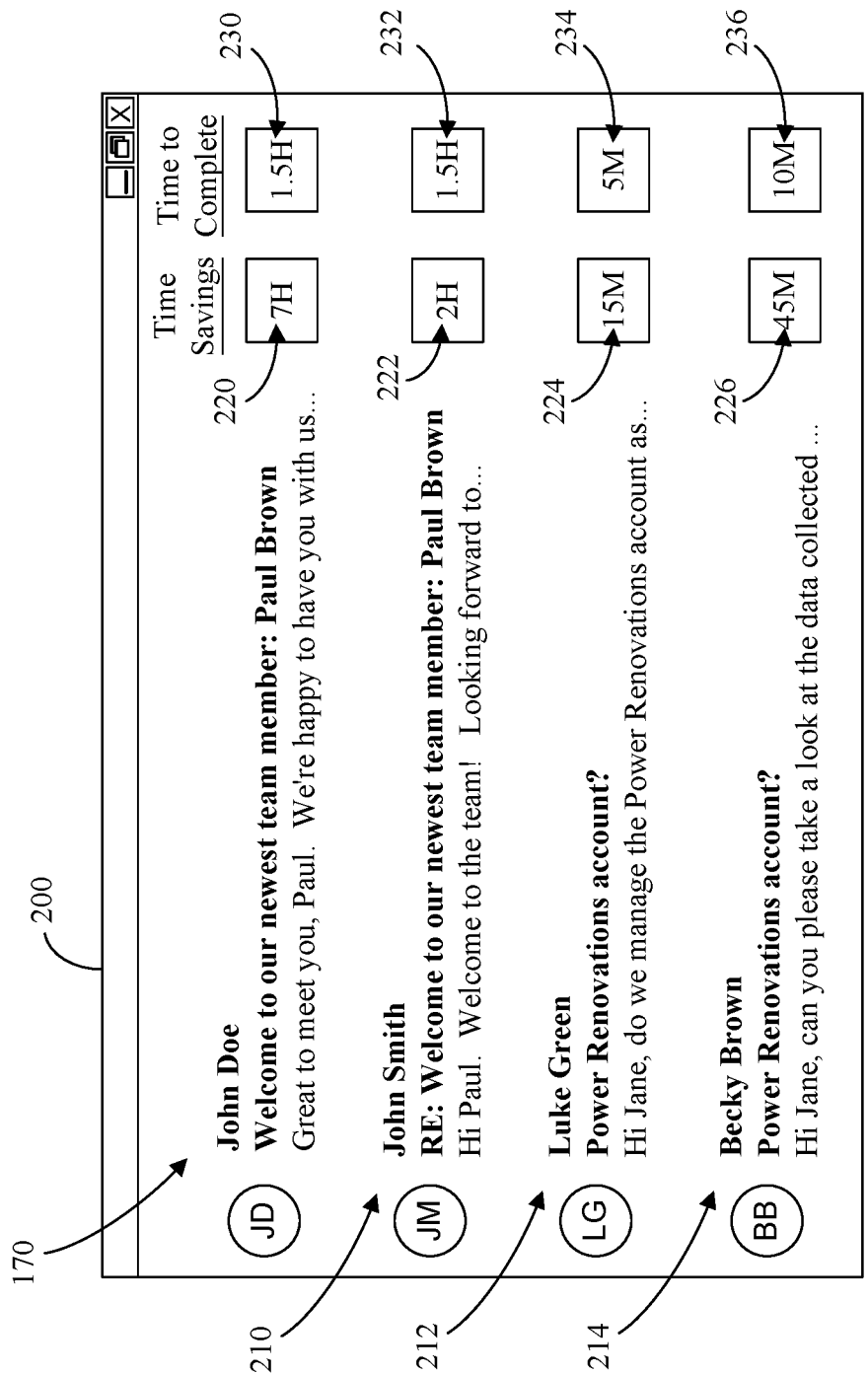
FIG. 2 depicts an example of a user interface view presenting electronic messages.

FIG. 2 depicts an example of a user interface view 200 presenting electronic messages 170, 210, 212, 214. Referring to FIGS. 1 and 2, the messaging client application 110 can present the view 200 to the user 130. For example, the messaging client application 110 can present the view on a display of the client device 120 in a user interface of the messaging client application 140. The view 200, for instance, can be a view of an electronic message inbox, a folder, and so on. Further, the view 200 can present electronic messages 170, 210-214 in a single message thread, or can present electronic messages 170, 210-214 in a plurality of message threads.

The messaging client application 110 can present in the view 200, with the electronic message 170, the determined time savings 220 and/or the determined completion time 230 for that electronic message 170. For example, the messaging client application 110 can present the time savings 220 and/or completion time 230 in a manner that associates such value(s) with the electronic message 170. In illustration, the time savings 220 and/or completion time 230 can be presented within a threshold distance from the electronic message 170. In this regard, the time savings 220 and/or completion time 230 can be presented to the right of the electronic message 170, to the left of the electronic message 170, above the electronic message 170, below the electronic message 170, or presented in any other manner that indicates an association between the electronic message 170 and the time savings 220 and/or completion time 230.

The view 200 also can present other electronic messages 210, 212, 214. If a time savings 222 and/or completion time 232 has been determined for the electronic message 210, the view 200 also can present the time savings 222 and/or completion time 232 in a manner that indicates an association between the electronic message 210 and the time savings 222 and/or completion time 232. Similarly, if a time savings 224 and/or completion time 234 has been determined for the electronic message 212, the view 200 can present the time savings 224 and/or completion time 234 in a manner that indicates an association between the electronic message 212 and the time savings 224 and/or completion time 234. Also, if a time savings 226 and/or completion time 236 has been determined for the electronic message 214, the view 200 can present the time savings 226 and/or completion time 236 in a manner that indicates an association between the electronic message 214 and the time savings 226 and/or completion time 236.

Further, the messaging client application 110 can sort the electronic messages 170, 210-214 in an order based on respective priorities assigned to the electronic messages 170, 210-214. In another arrangement, the messaging client application 110 can sort the electronic messages 170, 210-214 in an order based on the respective time savings 220, 222, 224 or the completion times 230, 232, 234. In illustration, the messaging client application 110 can sort the electronic messages 170, 210-214 with the electronic message 170 assigned the highest time savings 220 at the top, the electronic message 210 assigned the next highest time savings 222 below the electronic message 170, the electronic message 212 assigned the third highest time savings 224 below the electronic message 210, and so on.

Presenting the electronic messages 170, 210-214 with the determined time savings 220, 222, 224 and/or sorting the electronic messages 170, 210-214 as described can serve to inform the user 130 to which of electronic messages 170, 210-214 the user 130 should give top priority and attend, which will improve the productivity of the users 130-134 in the work environment. For example, if the electronic message 170 indicates the highest amount of time savings 220, the user 130 can respond to that electronic message 170 and/or initiate actions requested in the electronic message 170 prior to responding to and/or initiating actions requested in the electronic messages 210, 212. Because the electronic message 170 indicates the highest amount of time savings 220, doing so can free a significant amount of time for the user 134 who will benefit from the time savings 220, and thus improve overall productivity of a team or organization with which the users 130, 134 work.

In one aspect of the present arrangements, time zones of the senders 132, 134 and the recipient 130 can be considered when sorting the electronic messages 170, 210-214. In illustration, based on the time difference between the time zones, the attention management service 114, messaging server application 112 and/or messaging client application 140 can determine a different sorting order for at least some of the electronic messages 170, 210-214. In illustration, the attention management service 114 can perform an algorithm to determine priority of the electronic messages 170, 210-214 that includes as parameters the respective time zones, the respective time savings 220-226, the respective completion times 230-236, and times when the respective electronic messages 170, 210-214 are sent and/or received. The messaging client application 140 can sort the electronic messages 170, 210-214 based on the results of that algorithm.

By way of example, assume that a sender 134 of the electronic message 214 is located in a time zone that is three hours behind the time zone in which the recipient 130 and the sender 132 of the electronic message 212 are located. Also assume that the electronic message 214 was sent to the recipient 130 after close of business in recipient's time zone. Because the time zone of the sender 134 is three hours behind the time zone of the recipient 130, and the completion times 232, 234 for the electronic messages 212, 214 are small amounts of time (e.g., less than a threshold value), the algorithm can assume that the recipient 130 will be able to attend to the electronic messages 212, 214 prior to the start of business in the time zone of the sender 134 of the electronic message 214. Accordingly, the attention management service 114, messaging server application 112 and/or messaging client application 140 can determine to place the electronic message 212 in the view 200 above the electronic message 214, even though time savings 226 for the electronic message 214 is greater than the time savings for the electronic message 212. Thus, the time savings 224 for the sender 132 can be realized earlier in the day than would otherwise be the case if the recipient 130 first attended to the electronic message 214. Nonetheless, after attending to the electronic message 212, the user 130 still will have adequate time to attend to the electronic message 214 before the sender 134 starts her working day, and thus she will not be held up due to the user 130 first attending to the electronic message 212.

Further, the attention management service 114 can assign priorities to the electronic messages 170, 210-214 based, at least in part, on due times/dates indicated in the electronic messages 170, 210-214. The assigned priorities can be, for example, inversely proportional to an amount of time between a current time/date and times/dates in the electronic messages 170, 210-214 indicating when a response/action is due. Thus, an electronic message 212 for which a response/action is requested to take place by today can be given greater priority than an electronic message 214 for which a response/action is requested to take place tomorrow, etc. In some cases, a plurality of electronic messages 170, 210-214 may indicate that a response/action is due on the same day. The priority assigned to an electronic message 170, 210-214 and/or a time savings 220-226 indicated for the electronic message 170, 210-214 can increase as the due date/time gets closer. Further, the attention management service 114 can remove an electronic message 170, 210-214 from the view 200 due to lack of activity on the electronic message 170, 210-214, for example if the user 130 does not open the electronic message 170, 210-214, or the due date/time of the message passes without the user 130 responding to, or performing a task requested in, the electronic message 170, 210-214. The algorithm executed by the attention management service 114 also can prioritize such electronic messages 170, 210-214 by evaluating the determined time savings 220-226, completion times 230-236 and/or time zones.

The attention management service 114 also can assign priorities to the electronic messages 170, 210-214 based, at least in part, on interest of the user 130 in the electronic messages 170, 210-214. For example, if the user does not open an electronic message 170 for a threshold period of time after the electronic message 170 is presented in the view 200, or the user closes an electronic message 170 within a threshold period of time after opening the electronic message 170, the attention management service 114 can determine there is low interest on the part of the user 130 in the electronic message. If, however, the user 130 opens the electronic message 170 and keeps the electronic message 170 open for at least a threshold period of time, the attention management service 114 can determine there is high interest on the part of the user 130 in the electronic message 170. In another example, if the historical activity data 186 indicates that the user 130 frequently performs an activity requested in the electronic message 170 (e.g., the user has performed the activity at least a threshold number of times over a certain period of time), the attention management service 114 can determine there is high interest on the part of the user 130 in the electronic message 170. If, however, the historical activity data 186 indicates that the user 130 does not frequently perform an activity requested in the electronic message 170 (e.g., the user has not performed the activity at least the threshold number of times over the certain period of time), the attention management service 114 can determine there is low interest on the part of the user 130 in the electronic message 170. If the attention management service 114 determines there is user has low interest on the part of the user 130 in the electronic message 170, the attention management service 114 can reduce the priority assigned to such an electronic message 170, and re-sort the electronic messages 170, 210-214 presented in the view 200 accordingly.

In an aspect of the present arrangements, via the messaging client application 140 the user 130 can specify other users 132-134 for whom the user 130 chooses to be presented the time savings 220-226 and/or completion times (e.g., using a whitelist) and/or specify other users 130-134 other users 132-134 for whom the user 130 chooses not to be presented the time savings 220-226 and/or completion times (e.g., using a blacklist). The attention management service 114 can initiate the various processes described herein to determine and present in the view 200 the time savings 220-226 and/or completion times only for electronic messages sent by other users 132-134 specified in the whitelist. The attention management service 114 can ignore electronic messages sent by other users 132-134 specified not specified in the whitelist or other users 132-134 specified in the blacklist.

In an arrangement, the attention management service 114 can determine other users 132-134 specified in the whitelist who are inactive. An inactive user can be a user with whom the user 130 exchanges less than a threshold number of electronic messages over a certain period of time. The attention management service 114 can store electronic messages received from such inactive users in a directory or folder for electronic messages received from inactive users, but need not determine the time savings and/or completion times for such electronic messages. Nonetheless, when desired, the user 130 can initiate the attention management service 114 to process such electronic messages to determine the respective time savings and/or completion times, for example by entering one or more user inputs into the messaging client application 140.

Referring again to FIG. 1, each of the activity monitoring services 150-154 can monitor activity of the respective users 130-134 using the client devices 120-124, generate corresponding activity data 180, 182, 184, and communicate the activity data 180, 182, 184 to the attention management service 114 via the communication network 160. The attention management service 114 can store the activity data 180-184 to at least one computer readable storage medium, for example to memory elements of the data processing system 110 and/or to memory elements of another device or system (e.g., a data storage system) to which the data processing system 110 is communicatively linked. In illustration, the attention management service 114 can store the activity data 180-184 to one or more database tables. In this regard, the attention management service 114 can maintain historical activity data 186, and update the historical activity data 186 with new activity data 180-184, in real time, as new activity data 180-184 is received. The attention management service 114 can process the historical activity data 186, as well as results of the NLP/semantic analysis, to determine the previously described time savings and completion times for various user 130-134.

The activity data 180-186 can include data indicating activities of the users 130-134 that are responsive to the users 130-134 accessing (e.g., opening) electronic messages. In illustration, assume the user 132 is a recipient of an electronic message 190 requesting the user 132 perform a task and/or respond to the electronic message 190. Processing the data of the electronic message 190 (e.g., MIME data, metadata and/or text), the attention management service 114 can determine the task/response being requested in the electronic message 190. The attention management service 114 can determine, from the activity data 182, activity data 182 corresponding to the task/response indicated in the electronic message 190. The attention management service 114 can create associations between the determined activity data 182 and the requested task/response in the historical activity data. For instance, the attention management service 114 can create a first record in a first data table including a record identifier, a user identifier for the user 132, a time/date stamp of the electronic message 190, and the requested task and/or response indicated in the electronic message 190. Further, the attention management service 114 can create one or more records in a second data table indicating one or more activities indicated in the activity data 182 that correspond to the task and/or response, an amount of time it takes the user 132 to complete the task and/or response (which can be indicated in the activity data 182), a time/date stamp indicating when the task and/or response was performed, and the record identifier for the first record. The record identifier can serve to link the first record to the corresponding records in the second data table using techniques well known in the art, thus linking the activities to the requested task and/or response indicated in the electronic message 190.

The activities indicated in the activity data 182 by the activity monitoring service 152 can include any type of activities the user 132 may implement to perform the task and/or response, for example interacting with the client device 122 to generate a response to the electronic message 190, generate a new electronic message, interact with one or more applications executing on the client device 122, and so on. The activity monitoring service 152 can identify such activity(ies) and monitor the amount of time it takes the user to perform the activity(ies), and include corresponding data in the activity data 182. In a case in which the electronic message 190 is, or includes, an actionable message, the user 132 can perform real time activities in line with the electronic message 190, and the activity monitoring service 152 can monitor such activities, including the amount of time the user 132 spends on such activities. An actionable message is a type of message known in the art (e.g., an html MIME type message) that provides information that recipients can quickly read and act upon within an electronic message without need to launch another application. In this regard, an actionable message can interface with services external to a messaging client application to exchange data.

In an aspect of the present arrangements, the activity monitoring service 152 can monitor entries by the user 132 into one or more applications, such as time entries into a time management application, time entries into a calendaring application, etc., and generate activity data 182 corresponding to the entries. In illustration, assume that the user created an entry in a time management application indicating an activity "create new employee profile" and an amount of time the user 132 spent on that activity. The activity monitoring service 152 can include in the activity data 182 data indicating the activity and the amount of time spent on that activity by the user 132. Assuming the electronic message 190 included a request for the user to create a new employee profile, the attention management service 114 can create in the historical activity data 186 a link between the activities/time and the request contained in the electronic message 190.

In a further aspect, the attention management service 114 can communicate a request to the activity monitoring service 152 that initiates the activity monitoring service 152 to present, in a user interface of the client device 122, a prompt (e.g., a pop-up window, an electronic message, etc.) asking the user 132 to input information indicating activities performed by the user 132 in response to a task and/or response indicated in the electronic message 190 and the amount of time the user 132 spend performing the activities. The activity monitoring service 152 can receive the information input by the user 132 in response to the prompt, and generate corresponding data in the activity data 182. The attention management service 114 can store such activity data 182 in the historical activity data 186, and link such activity data to the task and/or response indicated in the electronic message 190, for example as previously described.

Based on historical activity data 186 of each user 130-134, as well as information from electronic messages communicated to and/or from each user 130-134, the attention management service 114 can generate an activity model 192 for each type of tasked performed by each user 130-134. Each activity model 192 can be an analytical model which analyzes information contained in electronic messages and the historical activity data 186 of a respective user. The information contained in the electronic messages analyzed by an activity model 192 can include, for example, name references (e.g., user identifiers for senders and recipients of electronic messages and names included in text of electronic messages), action words (e.g., a task assigned to a name reference), natural language indicators for future needs/actions, problem words, indications on behalf of senders or automated senders, domains of senders and recipients, frequency of prior electronic messages, etc.

In illustration, for an activity "create new employee profile," the attention management service 114 can generate a first activity model 192 for the user 130, a second activity model 192 for the user 132, a third activity model 192 for the user 134, and so on. Each activity model 192 can indicate an amount of time expected for the respective user 130-134 to perform the activity. By way of example, for each activity model 192, the attention management service 114 can determine an average (e.g., mean, median or mode) amount of time the respective user 130-134 spent creating each new employee profile. The attention management service 114 can fine tune each activity model 192 as new activity data 180-184 is collected and added to the historical activity data 186. For instance, the efficiency of each user 130-134 at performing the activity may improve over time. The attention management service 114 can update the average amount of time using a threshold number of corresponding activity records, for example the last five, ten or twenty-five records.

The amount of time it takes different users 130-134 to perform a particular activity can vary. For example, the task "create new employee profile" may require access to specific information that may be more readily available to certain users. In illustration, the user 130 may be authorized to access various information needed to create new employee profiled, whereas the user 134 may not be authorized to access such information. Thus, in order to create a new employee profile, the user 134 may be required to obtain the information from another user who is authorized to access the information, or obtain temporary authorization to access the information. These added activities take additional time. Moreover, additional time may be spent by the user 134 waiting to receive the additional information or authorization to access the information. Accordingly, it may take the user 134 much more time to create a new employee profile than it would take for the user 130 to create the employee profile.

Briefly referring again to FIGS. 1 and 2, the time savings 220-226 and completion times 230-234 can be determined based on the activity models 192. For example, for a response/task requested in the electronic message 170, the time savings 220 can be the amount of time it would take the sender of the electronic message 170 to complete a task being requested in the electronic message, and the completion time 230 can be the amount of time it would take for the recipient of the electronic message 170 to complete the task. In another example, the sender 134 of the electronic message 170 may be blocked from performing work until the user 130 responds to, or performs at least one task, indicated in the electronic message 170. The time savings 220 can be the amount of time that will be saved for the sender 134 by the recipient 130 promptly responding to, or performing the at least one task, indicated in the electronic message 170.

Moreover, a particular task indicated in an electronic message 170 may be assigned among several recipients where each recipient is to perform a portion of a task (e.g., please fill out your portion of the attached retirement documents). The completion time 230 for each recipient can be the amount of time it will take that recipient to perform their portion of the task, while the time savings 220 can indicate the amount of time it would take the sender to perform all portions of the task.

By way of example, assume the electronic message 170 indicates "Subject: code review." The attention management service 114 can extract the subject of the electronic message 170 and text from the electronic message 170 (e.g., "code," "review," "git," "Java," "merge," "production," "defect," etc.). Based on NLP and semantic analysis performed on the subject and text, the attention management service 114 can determine the meaning of the words in the subject and text of the electronic message and, based on the historical activity data 186, assign amounts of time to each of the words and/or terms. For instance, the attention management service 114 can determine that activities related to the words "code" and "review" each will take ten minutes, and assign to each of the words "code" and "review" a score of ten minutes. The activity attention management service 114 can determine that the activity for addressing a production defect will take sixty minutes, and assign to the term "product defect" a score of seventy minutes. The activity attention management service 114 can determine the words "git," "Java," "merge" to be common words, and thus assign those words a score of 0 minutes. Thus, the attention management service 114 can determine the total score to be ninety minutes (e.g., 1.5 hours), and determine that amount of time to be the completion time 230.

In an aspect of the present arrangements, a standard amount of time can be determined for each activity. In illustration, an administrator can specify the standard amount of time, or the attention management service 144 can determine the standard amount of time (hereinafter "standard time") to be an average (mean, median or mode) time based on amounts of time previously spent by users 130-134 to perform the activity as indicated in the historical activity data 186. Each time a user 130-134 performs the same activity, the attention management service 114 can determine a difference between the standard time and the amount of time it took the user 130-134 to perform the activity, and store the difference as a time variance. The time variance can be a negative value or a positive value. The attention management service 144 can store the time variance in the historical activity data 186 and assign the time variance to the user 130-134 that performed the activity. Based on the time variances assigned to each user 130-134, the attention management service 144 can determine which users are most efficient at performing certain activities.

In an aspect of the present arrangements, the attention management service 144 can automatically generate electronic messages assigning activities (e.g., assigning tasks or requesting responses) to users 130-134. In illustration, assume the electronic message 170 sent to the user 130 requests the user 130 to perform at least one activity. Also assume that the user 130 is not efficient at performing the at least one activity or the user 130 is unavailable to perform the at least one activity. The attention management service 144 can detect such circumstance and, in response, identify another user 134 who is available to perform the at least one activity and who's time variance(s) for the activity(ies) indicate the user 134 is efficient at performing the activity(ies). The attention management service 144 can interface with the messaging server application 112 to send a new electronic message 194 to the user 134 requesting the user 134 perform the at least one activity.

The attention management service 144 can determine the user 130 is not efficient at performing the activity by accessing the time variance(s) assigned to the user 130 for the activity from the historical activity data 186 and analyzing the time variance(s). For example, if there are a plurality of time variances assigned to the user for that activity, the attention management service 144 can determine an average (e.g., mean, median or mode) of the time variances. If the average exceeds a threshold value, the attention management service 144 can determine that the user is not efficient at performing the activity. The attention management service 144 can determine the user 134 is efficient at performing the activity by accessing the time variance(s) assigned to the user 134 for the activity from the historical activity data 186 and analyzing the time variance(s).

The attention management service 144 can determine the user 130 is not available by interfacing with the messaging server application 112 to detect an out of office notification sent by the messaging client application 140 in response to receiving the electronic message 170, by interfacing with a calendaring application used by the user 130 that indicates the user is otherwise busy, analyzing other electronic messages communicated to the user 134 requesting the user 130 perform activities, and so on. The attention management service 144 can determine the user 134 is available by interfacing with a calendaring application used by the user 134 that indicates the user is not otherwise busy, analyzing other electronic messages communicated to the user 134 requesting the user 134 perform activities, etc.

In an aspect of the present arrangements, the attention management service 144 can interface with the messaging server application 112 to add to a message thread the electronic messages corresponding to one or more requested activities and sent to users 130-134. The electronic message sent to the user 130-134 who is most available to, or efficient at, at performing one or more activities requested in the electronic messages, or who has greatest interest at performing the activitity(ies) can be listed at the top of the message thread above the electronic messages sent to other users 130-134. In illustration, a user 134 can send the electronic messages to other users 130-132 via a messaging server application 112 that is a social networking service, and the electronic messages can request one or more of the users 130-132 to perform one or more activities. The attention management service 114 can determine who is most available to, or efficient at, performing the activitity(ies) requested in the electronic messages and/or who has greatest interest at performing the activitity(ies) using previously described processes and interface with the messaging server application 112 to sort the electronic messages accordingly.

Accordingly, the electronic message sent to the user 130-132 who is available, most efficient at performing the activitity(ies) and/or is most interested in performing the activitity(ies) can be indicated at the top of the message thread, bringing that user's attention to the electronic message. This can serve to prompt the user 130-132 to perform the activities corresponding to (e.g., requested by) the electronic message in an expedient manner, thereby maximizing the productivity of the users 130-134 in the work environment.

Figure 3:
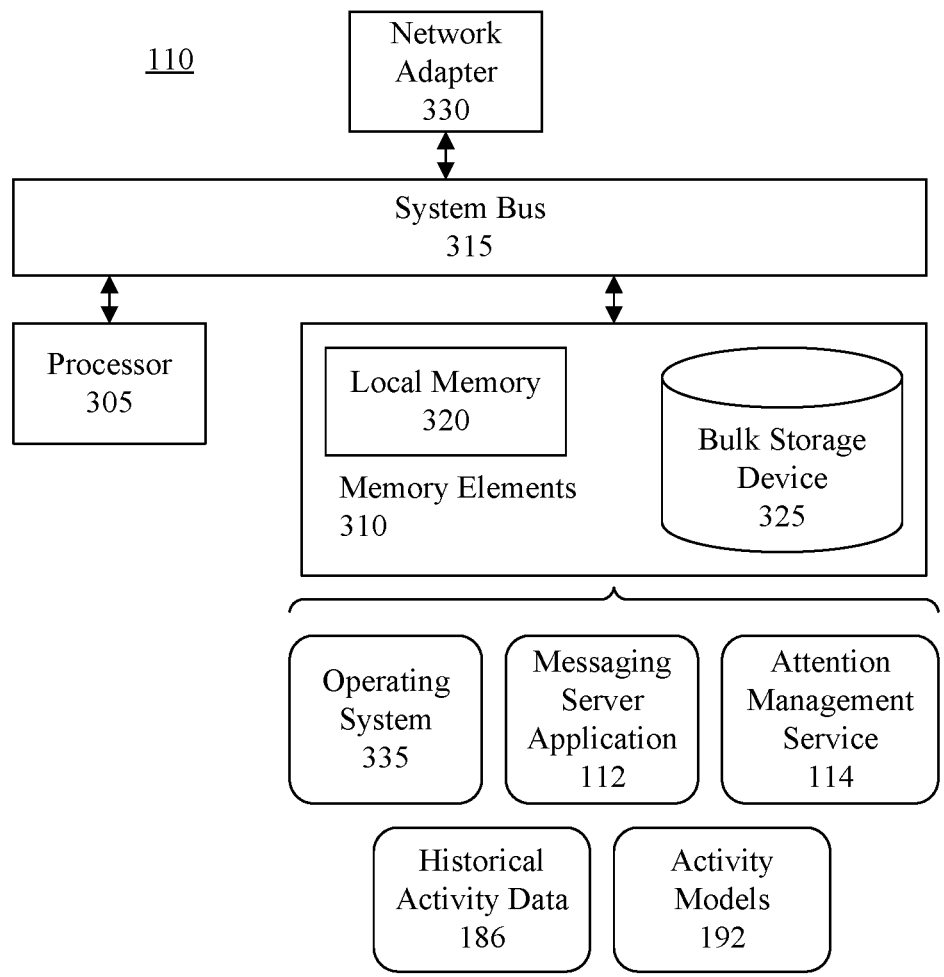
FIG. 3 is a block diagram illustrating example architecture for a data processing system.

FIG. 3 is a block diagram illustrating example architecture for a data processing system 110 of FIG. 1. The data processing system 110 can include at least one processor 305 (e.g., a central processing unit) coupled to memory elements 310 through a system bus 315 or other suitable circuitry. As such, the data processing system 110 can store program code within the memory elements 310. The processor 305 can execute the program code accessed from the memory elements 310 via the system bus 315. It should be appreciated that the data processing system 110 can be implemented in the form of any system including a processor and memory that is capable of performing the functions and/or operations described within this specification. For example, the data processing system 110 can be implemented as a server, a plurality of communicatively linked servers, and so on.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The data processing system 110 also can include one or more cache memories (not shown) that provide temporary storage of at least some program code in order to reduce the number of times program code must be retrieved from the bulk storage device 325 during execution.

One or more network adapters 330 also can be coupled to data processing system 110 to enable the data processing system 110 to become coupled to other systems, computer systems, remote printers, and/or remote storage devices through intervening private or public networks. Modems, cable modems, transceivers, and Ethernet cards are examples of different types of network adapters 330 that can be used with the data processing system 110.

As pictured in FIG. 3, the memory elements 310 can store the components of the data processing system 110, namely an operating system 335, the messaging server application 112, the attention management service 114, the historical activity data 186 and the activity models 192. Being implemented in the form of executable program code, the operating system 335, the messaging server application 112 and the attention management service 114 can be executed by the data processing system 110 and, as such, can be considered part of the data processing system 110. The historical activity data 186 and the activity models 192 can be generated and processed by the data processing system 110, and thus also can be considered part of the data processing system 110. Moreover, the operating system 335, the messaging server application 112, the attention management service 114, the historical activity data 186 and the activity models 192 are functional data structures that impart functionality when employed as part of the data processing system 110.

Figure 4:
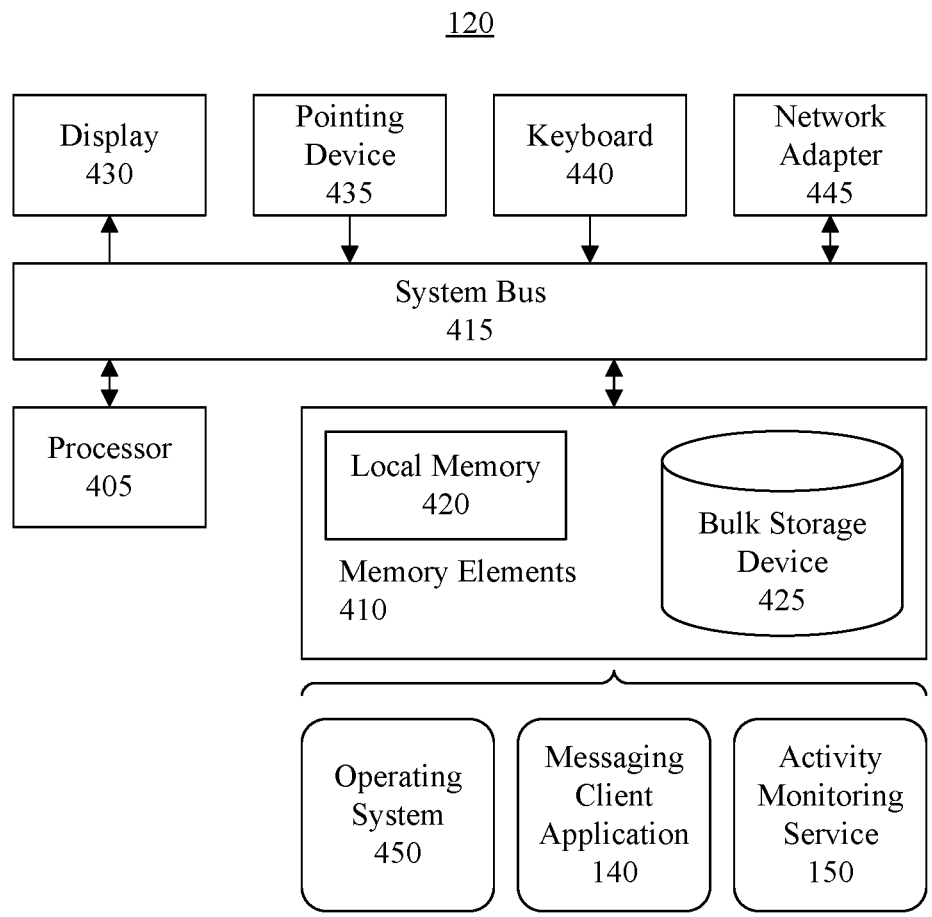
FIG. 4 is a block diagram illustrating example architecture for a client device.

FIG. 4 is a block diagram illustrating example architecture for a client device 120 of FIG. 1. The client devices 122, 124 can be configured in a similar manner. The client device 120 can include at least one processor 405 (e.g., a central processing unit) coupled to memory elements 410 through a system bus 415 or other suitable circuitry. As such, the client device 120 can store program code within the memory elements 410. The processor 405 can execute the program code accessed from the memory elements 410 via the system bus 415. It should be appreciated that the client device 120 can be implemented in the form of any system including a processor and memory that is capable of performing the functions and/or operations described within this specification. For example, the client device 120 can be implemented as a workstation, a desktop computer, a mobile computer, a tablet computer, a laptop computer, a netbook computer, a smart phone, a personal digital assistant, a network appliance, and so on.

The memory elements 410 can include one or more physical memory devices such as, for example, local memory 420 and one or more bulk storage devices 425. The client device 120 also can include one or more cache memories (not shown) that provide temporary storage of at least some program code in order to reduce the number of times program code must be retrieved from the bulk storage device 425 during execution.

Input/output (I/O) devices such as a display 430, a pointing device 435 and, optionally, a keyboard 440 can be coupled to the client device 120. The I/O devices can be coupled to the client device 120 either directly or through intervening I/O controllers. For example, the display 430 can be coupled to the client device 120 via a graphics processing unit (GPU), which may be a component of the processor 405 or a discrete device. One or more network adapters 445 also can be coupled to client device 120 to enable the client device 120 to become coupled to other systems, computer systems, remote printers, and/or remote storage devices through intervening private or public networks. Modems, cable modems, transceivers, and Ethernet cards are examples of different types of network adapters 445 that can be used with the client device 120.

As pictured in FIG. 4, the memory elements 410 can store the components of the client device 120, namely an operating system 450, the messaging client application 140 and the activity monitoring service 150. Being implemented in the form of executable program code, these components of the client device 120 can be executed by the client device 120 and, as such, can be considered part of the client device 120. Moreover, the operating system 450, the messaging client application 140 and the activity monitoring service 150 are functional data structures that impart functionality when employed as part of the client device 120.

FIG. 5 is a flowchart illustrating an example of a method 500 of presenting electronic messages. The method 500 can be implemented by the data processing system 110.

At step 502, the data processing system 110 can analyze each of a plurality of electronic messages communicated to a recipient, the analyzing comprising, for each of the electronic messages, determining, using a processor, an amount of time that will be saved for a sender of the electronic message by the recipient performing at least one activity corresponding to the electronic message.

Optionally, at step 504, the data processing system 110 can, for at least one of the electronic messages, analyze the electronic message to determine an estimate of an amount of time that will be required by the recipient to complete the at least one activity corresponding to the electronic message.

At step 506, the data processing system 110 can present the plurality of electronic messages to the recipient, presenting the plurality of messages comprising indicating, for each of the electronic messages, the determined amount of time that will be saved for the sender of the electronic message by the recipient performing the at least one activity corresponding to the electronic message. In an arrangement in which the data processing system 110 determines an estimate of an amount of time that will be required by the recipient to complete the at least one activity corresponding to at least one of the electronic messages, the data processing system 110 also can present to the recipient of the electronic message an indicator indicating the estimate of the amount of time that will be required by the recipient to complete the at least one activity corresponding to the electronic message.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
analyzing each of a plurality of electronic messages communicated to a recipient, the analyzing comprising, for each of the electronic messages, determining, using a processor, an amount of time that will be saved for a sender of the electronic message by the recipient performing at least one activity corresponding to the electronic message; and
presenting the plurality of electronic messages to the recipient, presenting the plurality of messages comprising indicating, for each of the electronic messages, the determined amount of time that will be saved for the sender of the electronic message by the recipient performing the at least one activity corresponding to the electronic message,
wherein the determining the amount of time comprises determining work that is blocked or pending action until the recipient performs the at least one activity corresponding to the electronic message.

2. The method of claim 1, further comprising:
for at least one of the electronic messages, analyzing the electronic message to determine an estimate of an amount of time that will be required by the recipient to complete the at least one activity corresponding to the electronic message; and
presenting to the recipient of the electronic message an indicator indicating the estimate of the amount of time that will be required by the recipient to complete the at least one activity corresponding to the electronic message.

3. The method of claim 1, further comprising:
for at least one of the electronic messages, determining the recipient is not efficient at performing the at least one activity;
responsive to the determining the recipient is not efficient at performing the at least one activity, determining a user who is efficient at performing the at least one activity, and automatically initiate communication of a second electronic message to the user who is efficient at performing the at least one activity, the second electronic message requesting the user to perform the at least one activity.

4. The method of claim 3, further comprising:
presenting the at least one of the electronic messages and the second electronic message in a message thread, wherein the second electronic message is presented in the message thread above the at least one of the electronic messages based on the determining the user to whom the second electronic message is sent being efficient at performing the at least one activity.

5. The method of claim 1, further comprising:
for at least one of the electronic messages, determining the recipient is not available to perform the at least one activity;
responsive to the determining the recipient is not available to perform the at least one activity, determining a user who is available to perform the at least one activity, and automatically initiate communication of a second electronic message to the user who is available to perform the at least one activity, the second electronic message requesting the user to perform the at least one activity.

6. The method of claim 5, further comprising:
presenting the at least one of the electronic messages and the second electronic message in a message thread, wherein the second electronic message is presented in the message thread above the at least one of the electronic messages based on the determining the user to whom the second electronic message is sent being available to perform the at least one activity.

7. A system, comprising:
a processor programmed to initiate executable operations comprising:
analyzing each of a plurality of electronic messages communicated to a recipient, the analyzing comprising, for each of the electronic messages, determining an amount of time that will be saved for a sender of the electronic message by the recipient performing at least one activity corresponding to the electronic message; and
presenting the plurality of electronic messages to the recipient, presenting the plurality of messages comprising indicating, for each of the electronic messages, the determined amount of time that will be saved for the sender of the electronic message by the recipient performing the at least one activity corresponding to the electronic message,
wherein the determining the amount of time comprises determining work that is blocked or pending action until the recipient performs the at least one activity corresponding to the electronic message.

8. The system of claim 7, the executable operations further comprising:
for at least one of the electronic messages, analyzing the electronic message to determine an estimate of an amount of time that will be required by the recipient to complete the at least one activity corresponding to the electronic message; and
presenting to the recipient of the electronic message an indicator indicating the estimate of the amount of time that will be required by the recipient to complete the at least one activity corresponding to the electronic message.

9. The system of claim 7, the executable operations further comprising:
for at least one of the electronic messages, determining the recipient is not efficient at performing the at least one activity;
responsive to the determining the recipient is not efficient at performing the at least one activity, determining a user who is efficient at performing the at least one activity, and automatically initiate communication of a second electronic message to the user who is efficient at performing the at least one activity, the second electronic message requesting the user to perform the at least one activity.

10. The system of claim 9, the executable operations further comprising:
presenting the at least one of the electronic messages and the second electronic message in a message thread, wherein the second electronic message is presented in the message thread above the at least one of the electronic messages based on the determining the user to whom the second electronic message is sent being efficient at performing the at least one activity.

11. The system of claim 7, the executable operations further comprising:
for at least one of the electronic messages, determining the recipient is not available to perform the at least one activity;
responsive to the determining the recipient is not available to perform the at least one activity, determining a user who is available to perform the at least one activity, and automatically initiate communication of a second electronic message to the user who is available to perform the at least one activity, the second electronic message requesting the user to perform the at least one activity.

12. The system of claim 11, the executable operations further comprising:
presenting the at least one of the electronic messages and the second electronic message in a message thread, wherein the second electronic message is presented in the message thread above the at least one of the electronic messages based on the determining the user to whom the second electronic message is sent being available to perform the at least one activity.

13. A computer program product, comprising:
a computer readable storage medium having program code stored thereon, the program code executable by a data processing system to initiate operations including:
analyzing each of a plurality of electronic messages communicated to a recipient, the analyzing comprising, for each of the electronic messages, determining an amount of time that will be saved for a sender of the electronic message by the recipient performing at least one activity corresponding to the electronic message; and
presenting the plurality of electronic messages to the recipient, presenting the plurality of messages comprising indicating, for each of the electronic messages, the determined amount of time that will be saved for the sender of the electronic message by the recipient performing the at least one activity corresponding to the electronic message,
wherein the determining the amount of time comprises determining work that is blocked or pending action until the recipient performs the at least one activity corresponding to the electronic message.

14. The computer program product of claim 13, wherein the program code is executable by the data processing system to initiate operations further comprising:
for at least one of the electronic messages, analyzing the electronic message to determine an estimate of an amount of time that will be required by the recipient to complete the at least one activity corresponding to the electronic message; and
presenting to the recipient of the electronic message an indicator indicating the estimate of the amount of time that will be required by the recipient to complete the at least one activity corresponding to the electronic message.

15. The computer program product of claim 13, wherein the program code is executable by the data processing system to initiate operations further comprising:
for at least one of the electronic messages, determining the recipient is not efficient at performing the at least one activity;
responsive to the determining the recipient is not efficient at performing the at least one activity, determining a user who is efficient at performing the at least one activity, and automatically initiate communication of a second electronic message to the user who is efficient at performing the at least one activity, the second electronic message requesting the user to perform the at least one activity.

16. The computer program product of claim 15, wherein the program code is executable by the data processing system to initiate operations further comprising:
presenting the at least one of the electronic messages and the second electronic message in a message thread, wherein the second electronic message is presented in the message thread above the at least one of the electronic messages based on the determining the user to whom the second electronic message is sent being efficient at performing the at least one activity.

17. The computer program product of claim 13, wherein the program code is executable by the data processing system to initiate operations further comprising:
for at least one of the electronic messages, determining the recipient is not available to perform the at least one activity;
responsive to the determining the recipient is not available to perform the at least one activity, determining a user who is available to perform the at least one activity, and automatically initiate communication of a second electronic message to the user who is available to perform the at least one activity, the second electronic message requesting the user to perform the at least one activity.

* * * * *